April 30, 1940.  H. S. PIERCE  2,199,292

HEAVY DUTY DRIVE CHAIN

Filed Nov. 17, 1938  4 Sheets-Sheet 1

Inventor
Harold S. Pierce

April 30, 1940. H. S. PIERCE 2,199,292
HEAVY DUTY DRIVE CHAIN
Filed Nov. 17, 1938 4 Sheets-Sheet 3

Inventor
Harold S. Pierce
By L. Ronald Wynn
Attorney

Patented Apr. 30, 1940

2,199,292

UNITED STATES PATENT OFFICE 2,199,292

HEAVY DUTY DRIVE CHAIN

Harold S. Pierce, Indianapolis, Ind., assignor to Link-Belt Company, a corporation of Illinois Application November 17, 1938, Serial No. 241,037

22 Claims. (Cl. 74—245)

This invention relates to new and useful improvements in chains adapted for extra heavy duty and particularly chains of that character which can be run at high speed.

Due to the present day rapidly increasing size of motor trucks, a real demand has developed for chains of greater driving capacities in a limited space; i. e., a more compact, rugged chain that can be run at high speed over sprocket wheels of few teeth.

As chain driven trucks are capable of outperforming trucks employing other types of drives, these modern trucks, naturally, are being designed for chain drives. However, no provision is being made for the installation of roller chains of standard design which are increased in size to take care of the new load conditions. Moreover, the high speed operation of heavier roller chains of standard design, running on sprocket wheels of few teeth, introduces higher destructive shock values which definitely lessen the durability and reliability of such chains. Therefore, standard chain designs are not entirely adequate to meet the present day requirements of chain driven motor trucks.

It is the primary object of this invention to provide compact, rugged drive chains which are capable of smoother operation with less impact at meshing when operated at high speed.

A further important object of the invention is to provide drive chains which will be extremely durable and reliable when operating under very heavy loads and yet will not require any more operating space than standard, single width roller chains.

Another object of the invention is to provide drive chains which will run onto or mesh with a drive sprocket, having few teeth, under driving tension without any joint articulation occurring until the chain actually starts to partake of the angular motion of the sprocket and with the linear velocity of the chain coinciding with the angular velocity of the sprocket, thereby materially lessening the shock of meshing and the tendency to wear the driving teeth and resulting in smoother and more quiet operation.

A further object of the invention is to provide chains having better wearing areas and more efficient coaction with the sprockets than standard roller chains.

A still further object of the invention is to provide chain and sprocket mechanism, of the type wherein the sprocket teeth engage driving collars or rollers of the chain, and mechanism which will assist in the meshing of the chain with the sprocket to eliminate joint articulation and variations in chain velocity relative to sprocket velocity as the chain approaches and runs onto the driving sprocket.

Still another object of the invention is to provide chains of the driving collar type having driving and driven contact surfaces of considerable area which flatly engage similar surfaces of the sprocket teeth with the result that there is provided lower unit pressure and better wearing value.

Other objects and advantages of the invention will be apparent during the course of the following description.

In the accompanying drawings forming a part of this specification and in which like numerals are employed to designate like parts throughout the same.

The most commonly used type of roller drive chain, and what is known as standard roller drive chain, is made up of inside and outside links having straight or flat side bars. The opposite ends of the side bars for the inside links are connected by tubular bushings. The opposite ends of the side plates for the outside links are connected together and are joined to the ends of the inside links by chain pins. These chain pins pass through the bores of the bushings to form articulating joints between adjacent links. A driving roller is journaled on each bushing. These driving rollers engage the working faces or contact surfaces of the sprocket teeth. This standard roller chain is so well known that it is not believed to be necessary to provide a figure on the drawings to illustrate the same.

The conventional form of sprocket wheel arrangement for a standard roller chain drive consists of a driven sprocket and a driver or driving sprocket. The driver usually is of less diameter than the driven sprocket. With this type of drive assembly, there are four principal points of chain action. At the points where the chain leaves the driver and the driven sprocket, there is no appreciable shock produced. At the point where the chain contacts or runs onto the driven sprocket, there occurs a slight joint articulation, but as the chain is not operating under a driving tension but is running slack, the shock which does occur is not sufficient to have a material detrimental effect on the life of the chain and driven sprocket. However, at the point where the chain runs onto the driver, the chain is under driving tension and the destructive shock which really has a detrimental effect occurs at this point.

Figure 1:
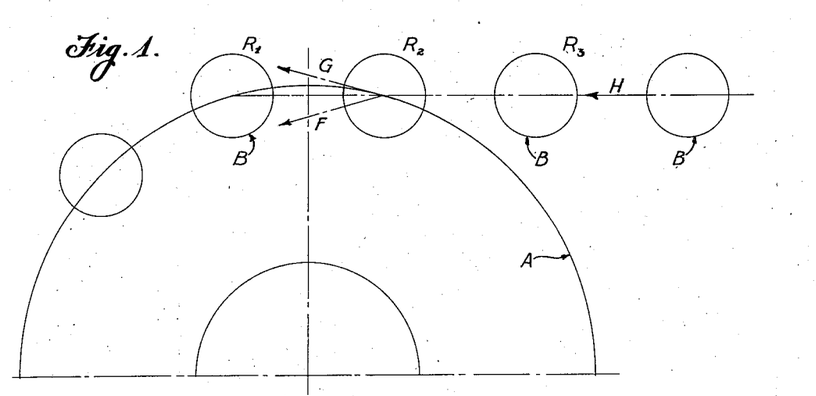
Figure 1 is a diagrammatic view which illustrates the action of a standard roller chain as it runs onto a sprocket.

The particular chain action which produces the destructive shock at the point where the chain runs onto the driver will be explained in connection with the diagrammatic showing of Fig. 1. The arcuate line A may be considered as representing the pitch circle of a driving sprocket. The small circles B may be considered as representing the driving rollers of a standard roller chain. The driving rollers approach the pitch circle A along the line H and travel in the direction indicated by the arrow-head associated with this line. The characters R1, R2 and R3 represent positions occupied by each driving roller B as it approaches and runs onto the sprocket. The position R1 illustrates a driving roller B which has been wholly seated on the sprocket and its axis or center of articulation is arranged in the pitch circle A and the driving roller has an angular velocity the same as that of the sprocket. The position represented by the character R2 is one which is assumed by a driving roller just as it is coming into its seat on the tooth of the sprocket. During its travel from the position represented by the character R3 toward position R2, the direction of motion of each roller is governed by the direction of motion of the next preceding roller during its respective travel from position R2 to position R1; i. e., the following roller partakes of the motions of the leading roller. At the time the following roller is moving into contact with the sprocket, which contacting position is represented by R2, its direction of motion is indicated by arrow line F. At the instant of conact, the direction of motion abruptly changes to that indicated by arrow G. It will be appreciated that this abrupt change in direction of travel occurs as a result of contact of the roller with the sprocket and a very destructive shock must necessarily result. Therefore, if this abrupt change in the direction of travel at the instant of contact is either entirely eliminated, or materially reduced, the resultant shock will likewise be either eliminated or reduced.

It will be appreciated that during the travel of a driving roller from the position R2 to the position R1, it has been acting as a lead horse controlling the direction of motion and the rate of advance of the driving section of the chain. However, because of the change in the direction of motion of each driving roll in moving from the position R3 to the position R2, the linear velocity of the approaching driving rollers cannot coincide with or be the same as the angular velocity of the rollers in traveling from the position R1 around the outer side of the sprocket. It is necessary, therefore, for the driving rollers to change their velocity or rate of travel in approaching and actually running onto the sprocket.

This change in direction of travel and change in velocity produce a very sharp destructive impact or shock. It is not difficult to appreciate how the intensity of the impact or shock increases rapidly as the velocity increases and the number of sprocket teeth decrease. An increase in the weight of a chain operating at high speed also increases the intensity of the impact or shock which occurs as the chain runs onto the driver.

One of the principal purposes of this invention is to provide a chain and sprocket drive assembly which will permit the chain to approach and run onto the sprocket without change in direction of motion and at a linear velocity which is the same as the angular velocity of the sprocket, thereby eliminating the destructive shock produced by the chain action described in connection with Fig. 1.

Figs. 2 to 6, inclusive, illustrate one form of chain which is capable of producing these desired results. This chain is of the same general design as the above referred to standard roller chain, but because it cooperates with the driver in a peculiar manner so as to eliminate to a very great extent the sharp destructive shock which occurs at meshing of a standard roller chain, the same size chain is capable of standing up under much heavier duty and higher speed than the standard roller chain. This type of chain, therefore, is ideal for use on heavy trucks operating at high speed.

Figure 2:
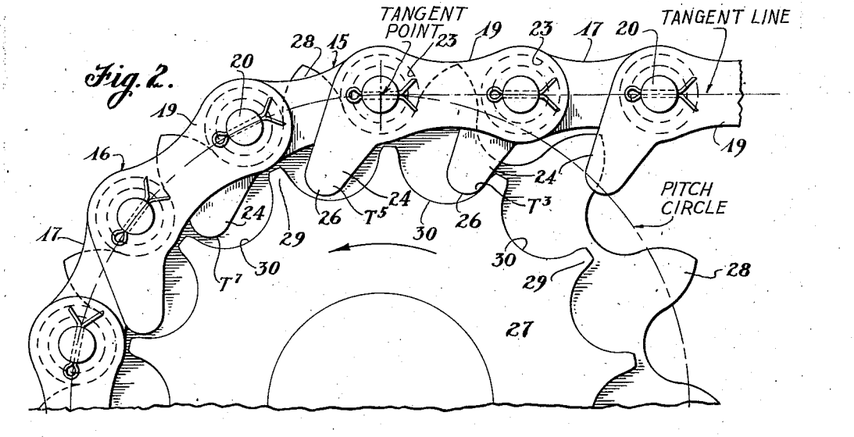
Figure 2 is a fragmentary side elevational view of a novel form of roller chain embodying this invention and a drive sprocket around which the chain is trained.
Figure 3:
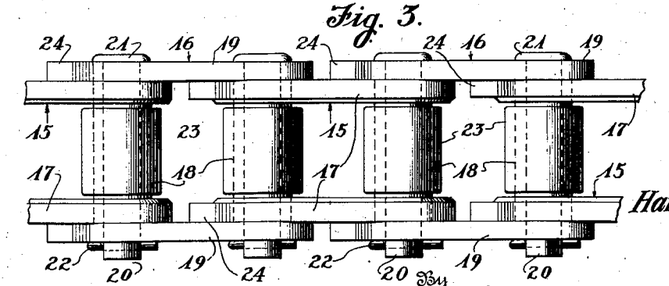
Figure 3 is a bottom plan view of a section of the chain disclosed in Fig. 2.

Figs. 2 and 3 clearly illustrate the chain as consisting of inside links 15 and outside links 16. The inside links are formed of straight or flat side plates 17 which are joined at their ends by bushings 18. The outside links are formed by straight or flat side plates 19 which are connected at their ends by chain pins 20. These chain pins are each headed at 21 and pass through the bores of the bushings 18 so as to form articulating joints between adjacent links. The opposite ends of the chain pins are provided with cotter pins, or the like, 22 which prevent withdrawal of the pins. Driving rollers 23 are journaled on the bushings 18 and, of course, function to lessen wear of the chain and sprocket in the usual manner.

Figure 6:
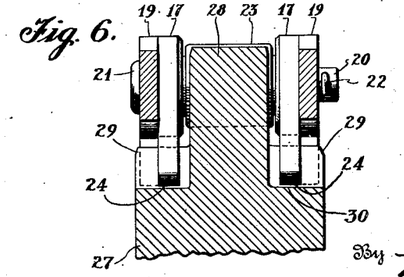
Figure 6 is a transverse sectional view taken on line 6—6 of Fig. 4.

Figs. 2, 3 and 6 clearly illustrate a mesh assisting tooth which is formed on the leading end of each chain link side plate. All of these teeth are identified by means of the reference character 24. It will be seen that these teeth are formed integrally with their chain link side plates and project forwardly and inwardly from the leading ends of the side plates. The extremities of these teeth are of semi-cylindrical formation, as is clearly shown in the several figures. These extremities are identified by the reference character 26. The semi-cylindrical extremities 26 form the contact or working surfaces of the teeth and it will be noted by considering Figs. 2 and 4 that these working surfaces project beyond the pitch centers or axes of the adjacent ends of their links.

Figure 4:
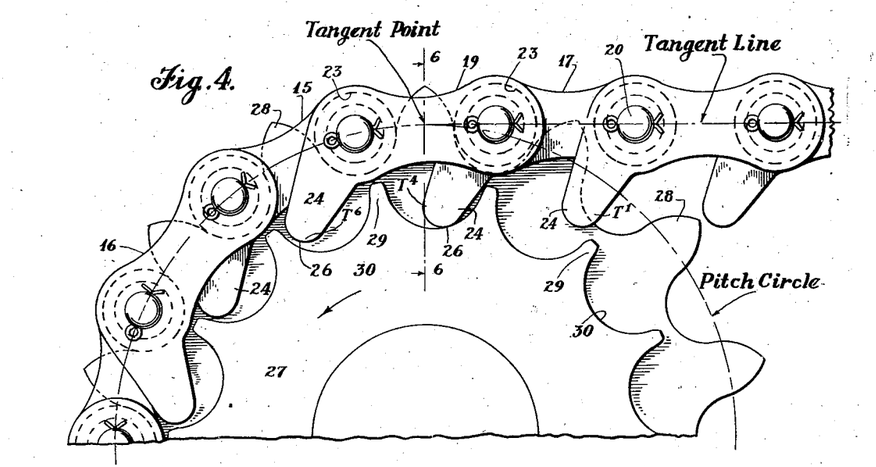
Figure 4 is a similar view to Fig. 2, but illustrates the sprocket angularly displaced a distance substantially equal to one-half the pitch of the chain.

Figs. 2, 4 and 6 disclose the special form of driver employed in connection with this type of chain. Fig. 6 best discloses the sprocket 27 as having a main set of drive teeth 28 and two auxiliary sets of teeth 29. The auxiliary sets of teeth are concentrically arranged with respect to the set of driving teeth 28 but are of less diameter. The respective teeth of both of the auxiliary sets 29 are transversely aligned with respect to each other. Figs. 2 and 4 disclose one auxiliary set of teeth 29 and the main drive teeth 28 in elevation and it will be noted that the auxiliary teeth 29 are offset circumferentially of the main driving teeth. The driving teeth are generated so as to provide each tooth with a profile which is conventional for standard roller chains. The auxiliary teeth 29 are either cut or generated so as to provide semi-circular contact or working surfaces 30. Although Fig. 6 discloses a one-piece sprocket 27, it will be understood that the sprocket may be formed in three sections with the various sets of teeth 28 and 29 being formed in the peripheries of the respective sections.

The action of the mesh assisting teeth 24 and 29 on the chain and sprocket, respectively, will be described in connection with Figs. 2, 4 and 5. It will be noted by inspecting Figs. 2 and 4 that the various links of the chain are traveling so that the axes of the several articulating joints occupy approximately what is identified as the "tangent line." This tangent line meets the pitch circle of the driving teeth 28 at the top dead center of the pitch circle or at what is labelled the "tangent point." The positioning of the auxiliary teeth 29 relative to the driving teeth 28 and the profile of the teeth 24 and 29 will determine the line of approach.

As the links approach the driver 27 on the tangent line, contact is made without causing a change in direction of motion or velocity of chain joint until the joint centers reach the tangent point and partake of the angular motion of the sprocket. The driving rollers 23, therefore, will not engage the driving teeth 28 until their axes practically reach the tangent point. As no joint articulation has occurred prior to that time, the linear velocity of the approaching driving rollers will be the same as the angular velocity of the sprocket. The driving rollers, therefore, will make contact with the teeth without any really detrimental destructive shock occurring and practically under no load with the result that there is less tendency to wear the driving teeth and smoother and more quiet operation is obtained.

The meshing of the auxiliary chain teeth 24 with the auxiliary sprocket teeth 29 functions to maintain the pitch axes or the centers of articulation of the various chain links approximately on the tangent line as they approach the driver 27. Fig. 4 discloses the position of a chain tooth 24 just prior to its engagement with the leading or forward contact face 30 of one of the auxiliary teeth 29. This chain tooth position will be identified by the character T1. Fig. 5 discloses in full lines one link side plate which is in the position assumed by the same at the instant the working or contact surface 26 of its tooth 24 engages the working surface 30 of an auxiliary tooth. This link is illustrated in dot-and-dash lines in the position it assumes after full meshing of the driving rollers at both ends of the link or with the two centers of articulation occupying the pitch circle. This figure also discloses several additional dotted circles which are intended to represent other positions occupied by the extremity of the tooth 24 during its action with respect to the auxiliary contact tooth surface 30. One of these dotted circles corresponds with the tooth position T1 of Fig. 4 and is so identified.

Figure 5:
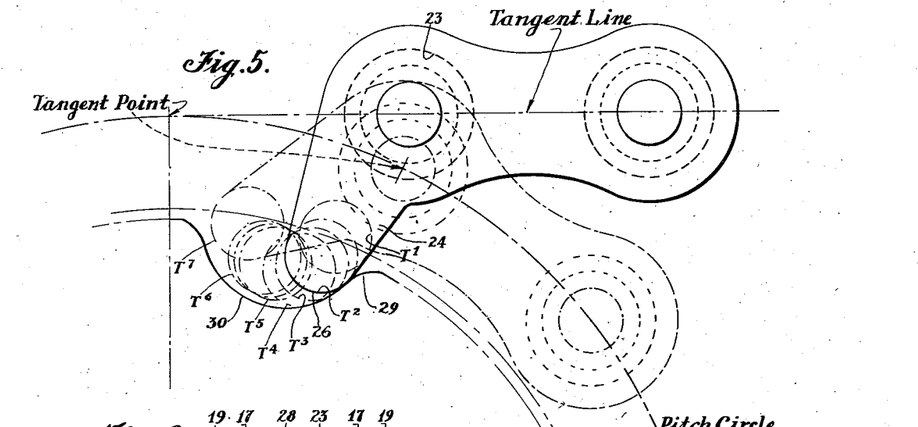
Figure 5 is a detail schematic view illustrating the action of a single link as it runs onto the sprocket.

Figs. 2 and 5 disclose an auxiliary chain tooth 24 in contact with the working face 30 of a sprocket tooth 29. The full line disclosure of Fig. 5 illustrates the auxiliary tooth 24 at the instant it contacts the working surface of the tooth 29. This chain tooth position will be identified by the character T2. The tooth of the Fig. 2 disclosure has advanced slightly from the position T2 into a position which will be identified by the character T3. This position also is illustrated in Fig. 5 by one of the dotted circles. Again referring to Fig. 4, we find a chain tooth 24 occupying a tooth position which is identified as T4. This T4 position also is represented by one of the dotted circles in Fig. 5. Fig. 4 discloses the driving roller of the T4 position as being very closely associated with the contact or working surface of its associated driving tooth 28.

Fig. 2 illustrates the next position in the advance of a driving roller into mesh with a driving sprocket. In this position, the axis of articulation of one of the driving rollers coincides with the tangent point. This roller is fully seated in its driving position with respect to its driving sprocket tooth. The auxiliary tooth 24 associated with this drive roller is illustrated as having moved into tooth position T5 and in which position it has moved out of contact with the working surface 30 of its auxiliary tooth. This tooth position T5 also is represented by one of the dotted circles in Fig. 5. As the driving roller associated with and controlled by the tooth in the position T5 has fully assumed the driving load of the chain, its auxiliary tooth 24 need no longer contact the working surface 30 of its auxiliary sprocket tooth.

Tooth position T6, shown in Fig. 4, is that which is assumed by each link tooth 24 when the next following tooth 24 is in position T4 or just prior to the engagement of a driving roller with the following driving sprocket tooth. This following driving roller, of course, is connected to the trailing end of the chain link which has its auxiliary tooth 24 arranged in position T6. This T6 position is represented by an additional dotted circle in Fig. 5. Fig. 2 discloses an auxiliary chain tooth in position T7. When an auxiliary chain tooth occupies this position, the rollers for both of the ends of the link are seated on or arranged in contact with their driving teeth. This T7 position is disclosed in Fig. 5 in connection with the dot-and-dash showing of a chain link. From the T7 position, no change occurs until the chain leaves the driver.

It will be appreciated that Figs. 2, 4 and 5 disclose the character of mesh which occurs at the start of operation of a new chain and sprocket assembly; i. e., with the drive rollers in contact with the root line of the sprocket. After a certain period of service, the chain becomes longer in pitch due to wear at the joints. As a result of this wear, or increase in pitch, and chain tension, the rollers ride out to a slightly higher seating position on the leading surfaces of the driving teeth. When this higher seating of the driving rollers occurs, the auxiliary teeth 24 of the chain links, also, will seat higher on the auxiliary teeth 29. The auxiliary teeth 29 are made of sufficient height so that this higher seating can take place. In other words, tooth positions T2 to T4 will be moved slightly outwardly of the surface of the auxiliary tooth 29 from that illustrated in Fig. 5. Relatively smooth and noiseless action of the chain will occur, therefore, throughout the entire life of the chain.

The above description of the disclosures of Figs. 2, 4 and 5 has only referred to one auxiliary tooth 24 for each chain link. It is to be understood, however, that the auxiliary tooth 24 on the opposite side of each chain link is functioning in the same manner so as to keep the chain running true with the driver.

Figs. 7 to 10, inclusive, disclose a modified form of chain. This chain is designed for even heavier duties than that for which the chain of Figs. 2 to 6, inclusive, is intended. It embodies the same general mesh assisting teeth as that illustrated and described in connection with Figs. 2 to 6. This extra heavy duty chain of Figs. 7 to 10, inclusive, therefore, can be operated at as high a speed as the chain of Figs. 2 to 6.

Referring particularly to Figs. 7 to 10, inclusive, it will be noted that the chain is formed entirely of what is known as one-piece offset links 31. The articulating joints between adjacent links are formed by joint or chain pins 32. These chain pins extend through the bores 33, see Fig. 7, of the integral driving collars 34 which join the inside ends 35 of the link side plates 36, see Fig. 9. These pins also pass through pitch holes 37 formed in the outside ends of the link side plates, see Fig. 9.

It will be appreciated, therefore, that the links of this chain are extremely rugged and are composed simply of two parts; i. e., an offset link and a chain pin. Driving rollers are not provided in this type of link but the driving collars 34 are shaped in such a manner as to provide profiles or sprocket tooth contact surfaces of an extremely improved character.

Figure 7:
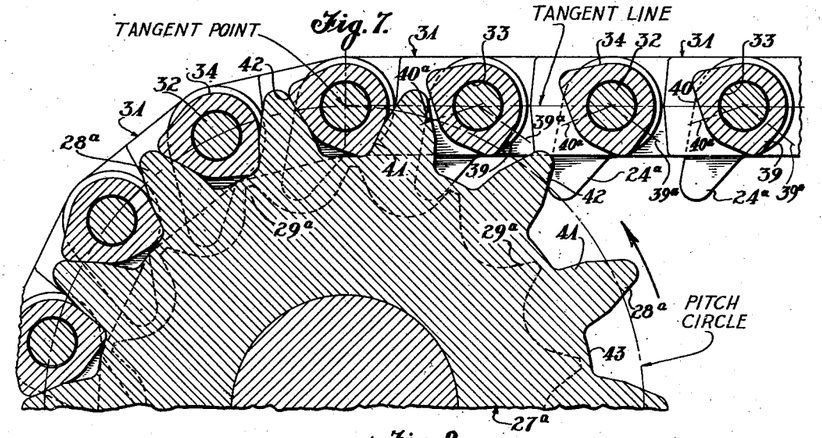
Figure 7 is a fragmentary vertical sectional view of a modified form of drive chain with its associated driving sprocket wheel.
Figure 8:
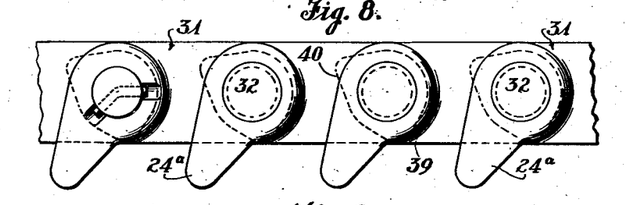
Figure 8 is a side elevational view of a section of chain of the type disclosed in Fig. 7.
Figure 9:
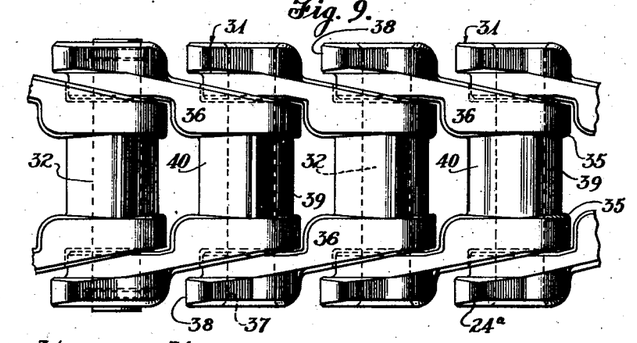
Figure 9 is a bottom plan view of the section of chain disclosed in Fig. 8.
Figure 10:
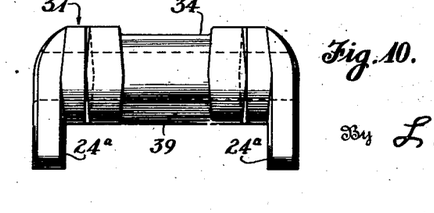
Figure 10 is an end elevational view of one chain link of the type disclosed in Figs. 7 to 9, inclusive.

By inspecting the sectional disclosure shown in Fig. 7, it will be seen that each driving collar 34 provides two flat contact surfaces 39 and 40. These contact surfaces extend throughout the entire width of the driving collars as is clearly disclosed in Fig. 9. These contact surfaces occupy planes which are angularly arranged with respect to each other and which are angularly arranged with respect to a plane passing through the axes of articulation of their respective link. The contact surface 40 of each driving collar is intended to be arranged so that its plane will make a greater angle with the plane passing through the articulation centers or axes than the angle formed by the plane of the surface 39 and said plane which passes through the articulation axes. In Fig. 7, the "tangent line" is representative of the plane which passes through the centers or axes of articulation of the various chain links leading up to the driver 27a. It will be noted that the contact surface 39 is located entirely inwardly of the plane which passes through the centers or axes of articulation while this said plane intersects the contact surface 40 substantially at its center. To permit the collars 34 to move into and out of mesh with the sprocket without binding on sprocket teeth surfaces, each surface 40, which is positioned between its two link joints, must be located entirely above the plane 40a, see Fig. 7, which is normal to the plane of said surface 40 and which passes through the axis of its collar. Each surface 39 must be located entirely below the plane 39a which is normal to the plane of said surface 39 and which passes through the axis of the collar.

Fig. 7 discloses the driver 27a as having driving teeth 28a which are generated to provide tooth profiles which include contact surfaces 41 and 42. When a new chain and sprocket assembly is first placed in operation, the surfaces 39 of the driving collars engage the surfaces 41 of the sprocket driving teeth 28a and the surfaces 40 of the driving collars engage the tooth surfaces 42. In other words, this type of contact occurs when the driving collars 34 completely seat between adjacent teeth and contact the root line or the surfaces 43 arranged between the driving teeth. As wear at the joints occurs and the pitch of the links increases, the contact surfaces 39 of the driving collars 34 will ride out slightly on the surfaces 41 of the driver teeth and the surfaces 40 of the driving collars will not make contact with the tooth surfaces 42.

It will be understood that the surfaces 39 of the driving collars are the driving surfaces of these collars, for they are the surfaces which are engaged by the driving teeth 28a for driving the chain. A driven sprocket is not illustrated, but it will be appreciated that the contact surfaces 40 of the driving collars will constitute the driven surfaces of these collars for these surfaces 40 will engage sprocket tooth surfaces 42 on the driven sprocket for delivering the driving force to this latter sprocket.

This type of chain is provided with auxiliary meshing teeth 44a in the same manner as that disclosed and described in connection with Figs. 2 to 6, inclusive. These mesh assisting teeth 24a are formed integrally with the leading ends of the outer sides of the link side plates 36 and they project forwardly and inwardly of the centers of articulation to the extent illustrated in Fig. 7. These auxiliary teeth 24a of the chain links cooperate with auxiliary sets of teeth 29a which are formed on the sprocket 27a. This cooperation between the mesh assisting teeth 24a and 29a is exactly the same as that described in connection with the form of chain shown in Figs. 2 to 6, inclusive. It will be unnecessary, therefore, to repeat the description of this auxiliary tooth action. It will be noted by inspecting Fig. 7 that these auxiliary teeth 24a and 29a cause the chain links 31 to approach the driver 27a approximately on the "tangent line." The various drive collars 34, therefore, will not fully contact the driving teeth 28a until the centers of articulation of the various links practically reach the "tangent point."

This type of chain, therefore, will operate just as smoothly and as quietly as the chain disclosed in Figs. 2 to 6, inclusive, and without any appreciable degree of destructive shock occurring as a result of meshing of the drive collars with the sprocket teeth. The driving and driven surfaces of the driving collars 34 and the driving and driven sprockets provide a considerable area of contact which will result in much lower unit pressure and better wearing value than can be obtained with driving rollers.

Although smoother operation with less destructive impact or shock at high speed is of great importance on most jobs, with certain of the heaviest duty trucks that are now in use, and which are contemplated for excavation and mining work in particular, the problem of very heavy loading at lower speed is involved. Standard roller chains cannot be satisfactorily employed under these conditions for the bore diameter of the rollers on this type of short pitch chain must be so near the outside diameter of the rollers that they do not always roll and thereby develop excessive unit load pressures on account of practically line contact occurring between the roller peripheries and the sprocket teeth.

Figure 11:
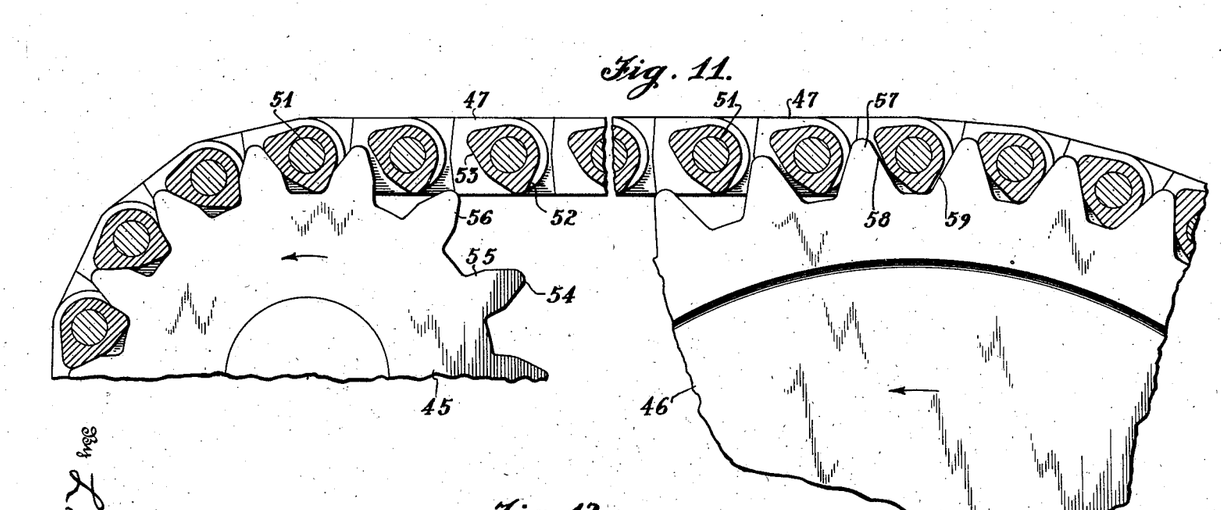
Figure 11 is a fragmentary side elevational view of a still further modified form of drive chain with its associated driver and driven sprockets.
Figure 12:
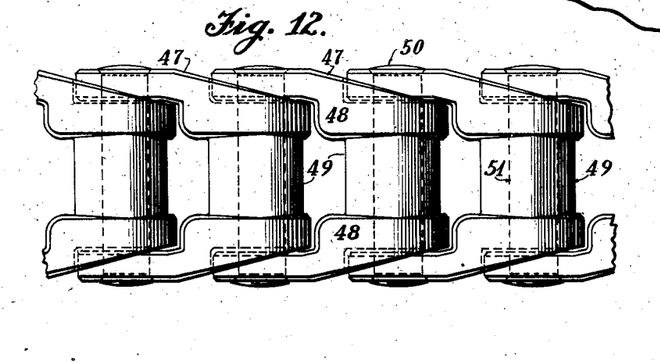
Figure 12 is a plan view of the type of chain disclosed in Fig. 11.

As an example of a very satisfactory drive chain for use on the heaviest duty trucks which will operate at lower speed, the chain design of Figs. 11 and 12 is disclosed. This chain is the same as that disclosed in Figs. 7 to 10, inclusive, with the mesh assisting teeth 24a omitted.

In Fig. 11, there is disclosed a driver 45 with a driven sprocket 46. The chain is made up of very rugged offset links 47. Each link includes two side plates 48 which are joined at their inner ends by means of the driving collars 49. Chain pins 50 extend through pitch holes formed in the outer ends of the link side plates and the bores 51 of the driving collars 49.

The various driving collars 49 are provided with contact areas 52 and 53 which are identical with the contact areas 39 and 40 of the driving collars 34 disclosed in Figs. 7 to 10, inclusive.

The driver 45 has its teeth 54 generated to provide proper tooth profiles which will include contact surfaces 55 and 56. These contact surfaces correspond with the surfaces 41 and 42 of the sprocket shown in Fig. 7.

Due to the greater number of teeth provided on the driven sprocket 46, the tooth profile will be different from that of the teeth 54 for the driver 45. The teeth 57 of the driven sprocket 46 will provide ample contact surfaces 58 and 59 for the contact surfaces 53 and 52, respectively, of the driving collars 49.

Due to the ruggedness of this type of chain, it will readily stand up under the impact resulting from meshing of the driving collars with the teeth of the driver. It, also, will be very durable and reliable when used on extra heavy duty trucks operating at lower speed and yet it will not occupy any more space than a single width standard roller chain.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In combination, a sprocket having driving teeth, a chain comprising a plurality of links each having side plates and intermediate articulating joint structures which drivingly engage the aforesaid sprocket teeth, and mesh assisting means in addition to the driving teeth of the sprocket and the said joint structures associated with the chain links and sprocket and being so constructed and arranged as to cause the chain link joint structures to approach and mesh with the sprocket drive teeth at a linear velocity which is the same as the angular velocity of the sprocket teeth and without causing change in direction of motion or velocity of the chain joint structures until the joint structures reach the tangent point, said mesh assisting means being rendered inactive by full meshing of the joint structures with the sprocket drive teeth.

2. In combination, a sprocket, a chain comprising a plurality of links having articulating joints with each link having side plates and an intermediate transverse driving element, and mesh assisting means associated with one side plate of each link and the sprocket so constructed and arranged as to cause the chain links to approach and mesh with the sprocket teeth at a linear velocity which is the same as the angular velocity of the sprocket teeth and without causing change in direction of motion or velocity of the chain joint until the joint reaches the tangent point.

3. In combination, a sprocket having driving teeth, a chain comprising a plurality of links each having side plates and intermediate articulated joint structures which drivingly engage the sprocket teeth, and auxiliary meshing teeth provided in addition to the sprocket driving teeth and said joint structures associated with the chain links and the sprocket and being so constructed and arranged as to cause the chain link joint structures to approach and mesh with the sprocket teeth at a linear velocity which is the same as the angular velocity of the sprocket teeth and without causing change in direction of motion or velocity of the chain joint structures until the joint structures reach the tangent point, said auxiliary meshing teeth of the chain links and sprocket being moved out of engagement with each other by full meshing of the joint structures with the sprocket drive teeth.

4. In combination, a sprocket, a chain comprising a plurality of links having articulating joints with each link comprising side plates and an intermediate, transverse driving element, and auxiliary meshing teeth associated with one side plate of each link and the sprocket so constructed and arranged as to cause the chain links to approach and mesh with the sprocket teeth at a linear velocity which is the same as the angular velocity of the sprocket teeth and without causing change in direction of motion or velocity of the chain joint until the joint reaches the tangent point.

5. In combination, a sprocket, a chain comprising a plurality of links having articulating joints with each link including side plates and an intermediate transverse driving element, and mesh assisting means associated with one side plate of each link and the sprocket so constructed and arranged as to maintain the transverse driving elements of the links out of contact with the teeth of the sprocket until the centers of articulation practically reach the tangent point.

6. In combination, a sprocket having a set of driving teeth and an auxiliary set of teeth concentrically arranged with respect to the driving set, a chain comprising a plurality of links having articulated joints, each of said links having side plates and an intermediate driving element adapted to mesh with the set of driving teeth, and a set of teeth carried by the side plates of the links and meshing with the auxiliary set of teeth on the sprocket prior to meshing of the drive element of the link with its driving tooth of the sprocket for controlling the mesh action of the chain with the drive teeth.

7. In combination, a sprocket having a set of driving teeth and an auxiliary set of teeth concentrically arranged with respect to the driving set, a chain comprising a plurality of links having articulating joints, each of said links having side plates and an intermediate driving element adapted to mesh with the set of driving teeth, and a set of teeth carried by the links and meshing with the auxiliary set of teeth on the sprocket for causing the chain links to approach and mesh with the driving teeth of the sprocket at a linear velocity which is the same as the angular velocity of the driving teeth and without meshing of the links with the driving teeth occurring until after the centers of articulation practically reach the tangent point.

8. In combination, a chain comprising a plurality of links each of which is formed with a transverse driving collar having a profile providing two spaced contact surfaces of considerable area, articulating pin joints between adjacent links, a sprocket having its drive teeth profiled to provide contact surfaces of considerable area to engage the contact surfaces of said drive collars, and mesh assisting means associated with the chain links and sprocket so constructed and arranged as to cause the chain link driving collars to approach and engage the sprocket teeth at a linear velocity which is the same as the angular velocity of the sprocket teeth and without engagement of the collars and teeth occurring until after the centers of articulation practically reach the tangent point.

9. In combination, a chain comprising a plurality of links each of which is formed with a transverse driving collar having a profile providing two spaced contact surfaces of considerable area, articulating pin joints between adjacent links, a sprocket having its drive teeth profiled to provide contact surfaces of considerable area to engage the contact surfaces of said driving collars, and means for controlling engagement of the link drive collars with the sprocket teeth comprising auxiliary meshing teeth carried by each chain link and the sprocket, the auxiliary teeth of the several links being so arranged with respect to their drive collars as to engage the auxiliary teeth of the sprocket in advance of engagement of the driving collars with the drive teeth of the sprocket to control the velocity and direction of approach of said driving collars.

10. In combination, a chain comprising inside and outside links connected by pin and bushing articulating joints and having a driving roller journaled on each bushing, a sprocket having teeth engageable by said driving rollers, and means associated with the chain links and the sprocket for controlling the velocity and direction of approach of said driving rollers to the sprocket teeth.

11. In combination, a chain comprising inside and outside links connected by pin and bushing articulating joints and having a driving roller journaled on each bushing, a sprocket having teeth engageable by said driving rollers, and means associated with the chain links and the sprocket for controlling the velocity and direction of approach of said driving rollers to the sprocket teeth, said means comprising an auxiliary set of teeth attached to the sprocket and a tooth attached to each chain link and meshing with the auxiliary teeth on the sprocket.

12. In combination, a chain comprising inside and outside links connected by pin and bushing articulating joints and having a driving roller journaled on each bushing, a sprocket having teeth engageable by said driving roller, and means associated with the chain links and the sprocket for controlling the velocity and direction of approach of said driving rollers to the sprocket teeth, said means comprising an auxiliary set of teeth on said sprocket concentrically arranged and having its teeth offset circumferentially with respect to the first mentioned sprocket teeth, and a tooth carried by each chain link and extending in advance of the same to engage the said auxiliary teeth.

13. In combination, a chain comprising a plurality of links connected by articulated joints and formed with a transverse driving collar having a profile providing two circumferentially spaced, substantially flat contact surfaces of considerable area, one of said surfaces forming a greater angle with a plane passing through the axes of the link joints than the other surface, articulating pin joints between adjacent links, and a sprocket having teeth profiled to provide contacting surfaces of considerable area to be engaged by the contact surfaces of said driving collars.

14. A link construction for a drive chain comprising a one-piece body including two offset side bars having a tubular, transverse drive collar connecting the inside ends of said side bars and pitch holes in the outside ends of said bars, said drive collar being shaped to provide a flat contact surface on each of its inner and outer sides, the contact surface on the inner side, which lies between the axes of said pitch holes and the tubular collar, being arranged to be intersected by a plane passing through said axes, the contact surface on the outer side of said collar being arranged entirely on one side of a projection of said plane.

15. In combination, a sprocket having a set of driving teeth and an auxiliary set of teeth radially and circumferentially offset with respect to the driving teeth, and a chain comprising a plurality of links having articulating joint structures adapted to mesh with the set of driving teeth and having side bars carrying teeth arranged to mesh with the auxiliary set of teeth.

16. In combination, a sprocket having a set of driving teeth and an auxiliary set of teeth radially and circumferentially offset with respect to the driving teeth, and a chain comprising a plurality of links having articulating joint structures adapted to mesh with the set of driving teeth and having side bars provided with teeth projecting inwardly and forwardly of the advanced ends of the side bars to mesh with the auxiliary set of teeth.

17. In combination, a sprocket having a set of driving teeth and an auxiliary set of teeth radially offset with respect to the driving teeth, adjacent teeth of said auxiliary set being shaped to collectively form curved contact surfaces between the same, and a chain comprising a plurality of links having articulating joint structures adapted to mesh with the set of driving teeth and having side bars carrying teeth provided with extremities which are curved so as to slidably engage and follow the curved contact surfaces of said auxiliary set of teeth.

18. In combination, a toothed sprocket, a chain comprising a plurality of links having articulating joint structures which drivingly engage the sprocket teeth, and mesh assisting means associated with the chain links and the sprocket, said mesh assisting means comprising members carried by the sprocket and each link which slidably engage each other to hold the axes of joint structures approaching the sprocket teeth on a single tangent line of the pitch circle of the sprocket teeth until the said axes substantially reach the point where said tangent line meets the pitch circle.

19. In combination, a toothed sprocket, a chain comprising a plurality of links having articulating joint structures which drivingly engage the sprocket teeth, and mesh assisting means associated with the chain links and the sprocket, said mesh assisting means comprising members carried by the sprocket and each link which slidably engage each other to hold the axes of joint structures approaching the sprocket teeth on a single tangent line of the pitch circle of the sprocket teeth until the said axes substantially reach the point where said tangent line meets the pitch circle, each pair of slidably engaging members being adapted to be disengaged as the next succeeding pair of members moves into engagement.

20. In a chain structure, a plurality of links formed with transversely spaced side plates and transverse driving members extending between said side plates and each having a profile providing two circumferentially spaced, substantially flat contact surfaces of considerable area, one of said surfaces forming a greater angle with a plane passing through the axes of the link joints than the other surface.

21. In a chain structure, a plurality of links connected by articulating joints and formed with transverse driving members each having a profile providing two circumferentially spaced, substantially flat contact surfaces arranged on each of its front and rear sides, the surface on the front side, which lies between the link joints, being arranged entirely above the plane which is normal to said front surface and which intersects the axis of the transverse driving member, the rear surface being arranged entirely below the plane which is normal to said rear surface and which intersects the axis of the transverse driving member.

22. In a chain structure, a plurality of links connected by articulating joints and formed with transverse driving members each having a profile providing two circumferentially spaced, substantially flat contact surfaces arranged on each of its inner and outer sides, the contact surface on the inner side, which lies between the axes of articulation of said links, being arranged to be intersected by a plane passing through said axes, the contact surface of the other side of said transverse driving member being arranged entirely on one side of a projection of said plane.

HAROLD S. PIERCE.